Patented June 8, 1948

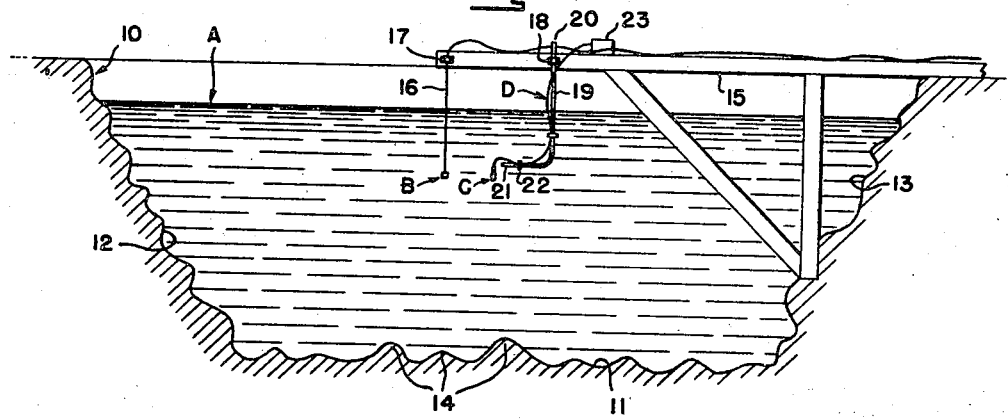
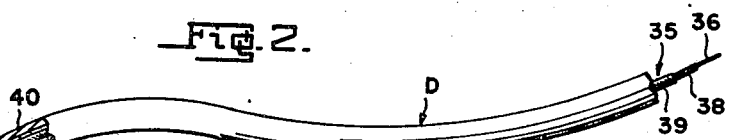
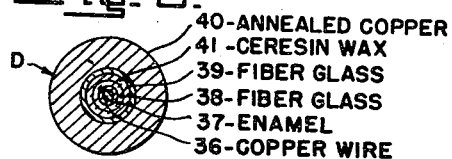
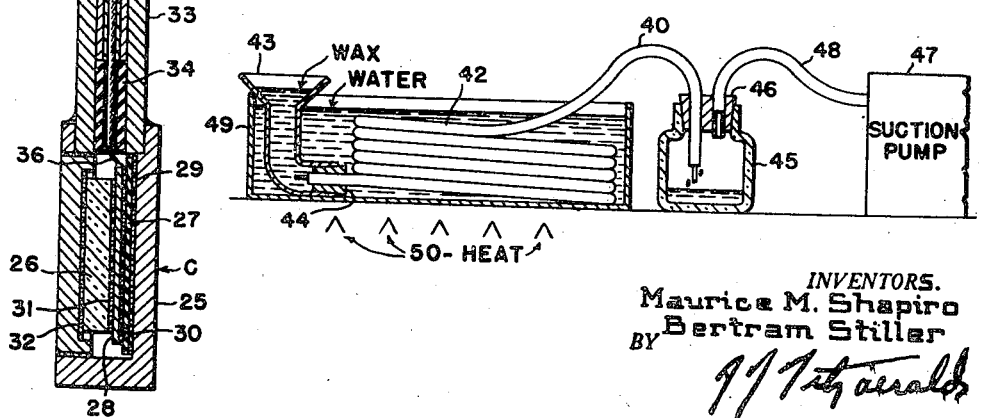

2,442,785

UNITED STATES PATENT OFFICE 2,442,785

SIGNAL-TRANSMITTING CABLE INSENSITIVE TO EXPLOSION PRESSURE PULSES

Maurice M. Shapiro and Bertram Stiller, Cabin John, Md.

Application February 14, 1944, Serial No. 522,288

2 Claims. (Cl. 174—102)

(Granted under the act of March 3, 1883, as amended April 30, 1928; 370 O. G. 757)

The invention relates to improvements in electric cables and methods of making the same, and more specifically to a coaxial conductor cable particularly well suited for use in the transmission of signal voltages, such as those produced by a piezoelectric device subjected to underwater explosion pressure waves of high amplitude and short duration.

Ordinary coaxial cables are unsatisfactory for signal transmitting use in the observation and measurement of pressure-time variations in the vicinity of an underwater explosion because such cables tend to produce signal distortion. The primary cause of this distortion appears to be mechanical disturbance of the cable by the explosion pressure wave. Most cables subjected to an underwater explosion generate a signal of low amplitude and long duration compared with the true signal. The pressure of the shock wave which produces the true signal may attain a peak value in less than one microsecond and may have a duration of less than 70 microseconds. Cable-generated signals may give rise to important errors in measurement on the initial part of the pressure pulse in an underwater explosion. Even larger errors may result, however, in pressure determinations during the ensuing period of several milliseconds characterized by distinctly lower pressures. The character of the tail of the curve corresponding to this later period may be completely masked by cable distortion. Finally, in measuring impulse, or momentum, the area under the pressure-time curve must be determined. Since the duration of the cable pulse is long compared with that of the true pressure pulse, a tail area of considerable size may make a spurious contribution as large as 20 percent to the measured impulse.

The aging effect of repeated explosions on a rubber-sheathed coaxial conductor cable has been previously observed. Records of successive explosions show a steady change in the condition of the rubber cable. The peak voltage of the cable-generated signal decreased in ten explosions to one-third of its initial value. This change is by no means irreversible. Thus, if an "aged" cable be rested for a week or two it tends to revert to its former condition and again give rise to large signals.

The primary object of the invention is to provide a coaxial conductor cable which will transmit the pressure-time signal produced by an underwater explosion without appreciable distortion.

Another object of the invention is the provision in combination with the foregoing features of a cable in which the dielectric absorption is so low that the capacity remains substantially the same over a wide range of frequencies, for example, between 100 cycles per second and 25 kilocycles per second.

A further object of the invention is the provision of a coaxial conductor cable which will transmit successive pressure-time signals produced by a series of underwater explosions without appreciable change.

A still further and important object is the provision of a pliable coaxial conductor cable whose electrical response to an underwater explosion pulse is not substantially changed by changes in its configuration.

The invention also aims to provide a coaxial conductor cable which is insensitive to orientation with respect to the pressure wave, is completely waterproof and combines all the foregoing characteristics with the advantage that it can be easily sealed into a high pressure vessel, as for calibration of a pressure gage, without injuring the cable.

Other objects and advantages of the invention will become apparent during the course of the following detailed description, taken in connection with the accompanying drawing, forming a part of this specification, and in which drawing, Figure 1 is a central vertical sectional view of a test pond and diagrammatically illustrating the use of the cable in the transmission of signal voltages produced by underwater explosions.

Figure 2 is a view partly in central vertical section and partly in side elevation and showing, on an enlarged scale, the cable connected to a suitable piezo-electric gage.

Figure 3 is a transverse sectional view, on an enlarged scale, of the improved coaxial conductor cable.

Figure 4 is a view, partly in vertical section and partly in side elevation, diagrammatically illustrating a method and apparatus for making the cable.

In the drawing, which for the purpose of illustration shows only a preferred embodiment of the invention, and wherein similar reference characters denote corresponding parts throughout the several views, the letter A generally designates any suitable body of water; B an explosive charge; C a suitable piezo-electric gage; and D the improved cable.

In the example shown, the body of water A is contained in a test pond 10 defined by a bottom 11 and sides 12, 13, preferably provided with irregularly shaped and spaced protuberances 14 tending to reduce wave reflections. This test pond 10 is provided with an overhanging platform 15 for supporting the test equipment and personnel. The test pond per se forms no part of the present invention and is shown merely for the purpose of illustration.

The explosive charge B may be supported at any suitable depth in the water A, as by an ignition cable 16 and a bracket 17 carried by the platform. Secured to the platform in spaced relation to the bracket 17 is another bracket 18 supporting the vertical leg 19 of a depending L-shaped bar 20. The gage C is vertically supported at the free end of the horizontal leg 21 by the downturned end of the cable D, which is attached to the horizontal leg at 22. The cable D at its submerged end, is bent so as to extend upwardly along the vertical leg of the L-shaped bar, and at its outer end is connected to any suitable receiving apparatus, diagrammatically shown at 23.

In the example shown, the gage C is of the piezo-electric quartz crystal type disclosed and claimed in Patent 2,408,816 dated October 8, 1946, on copending application of M. M. Shapiro Serial No. 521,885, filed February 10, 1944, but obviously any other suitable type gage may be used. The gage C includes a waterproof metal housing 25 containing a quartz crystal 26, a mica sheet 27 and a copper electrode 28, all cemented together as by layers of shellac 29—32. Extending from the housing 25 is a metal tube 33 provided with a Bakelite bushing 34.

Referring now to the improved coaxial conductor cable D, this includes an insulated conductor 35 having a central annealed copper wire 36 for connection at its submerged end to the electrode 28 of the gage C. The wire 36 is provided with an insulative coating 37 of enamel, and double coverings 38, 39 of glass fiber. This insulated conductor 35 is of the type commercially known as No. 20 or No. 24 DVE or Double Vitrotex Enameled wire.

Surrounding the insulated conductor 35 is a pliable annealed copper conductor tube 40 having an external diameter of one eighth inch and a wall thickness of one thirty-second inch. The tube 40 when so constructed may readily be bent by hand into any desired configuration but when subjected to under-water explosion pressure generated by detonation of high explosives remains within its elastic limit thus maintaining its original diameter. The elastic characteristic of the tube permits transmission by the cable of the signal generated by the piezoelectric gage without appreciable distortion due to mechanical disturbance of the cable components. The one-sixteenth inch internal diameter of the tube is sufficient to permit pulling the insulated conductor 35 therethrough and still leave an extremely small space between the exterior of the conductor and the interior of the tube. This space is substantially completely occupied by a ceresin wax filler 41, which may be inserted after the conductor 35 is disposed in the tube 40, as by the method and apparatus shown in Figure 4.

According to this method, the tube 40 is wound into a coil 42 and is connected at one end to the discharge end of a funnel 43, as by a stopper 44. The other end of the coil 42 is connected to a transparent receptacle 45, as by a stopper 46 which also serves to connect the receptacle to a suction pump 47 via tube 48. The coil 42 and the discharge end of the funnel 43 are immersed in a pan 49 of water which is heated by a suitable source of heat 50. A quantity of hot ceresin wax is poured into the funnel 43 and the suction pump 47 is operated to draw the wax in liquid form through the extremely small space between the insulated conductor 35 and the tube 40. By using the receptacle 45, the flow of wax through the coil may be continued for a sufficiently long time after the first drops of wax find their way through to insure that the space between the conductor and tube is completely filled, without liability of any wax being drawn into the suction pump.

The completed cable D is telescopically fitted, at its normally submerged end, into the reinforcing tube 33 of the gage C and soldered thereto as indicated at 51 in Figure 2. The wax filler 41 provides an insulating material of low dielectric absorption between the central and outer conductors and prevents relative movement therebetween when an explosion pressure pulse strikes the cable. The improved coaxial conductor cable D is made in an uninterrupted length sufficient to transmit the signal from the underwater zone of observation to the receiving apparatus 23, thus eliminating the possibility of leakage at underwater joints and tending to insure uniform pliability and electrical characteristics of the cable throughout its length.

Various changes may be made in the form of invention and method of manufacture herein shown and described without departing from the spirit of the invention or the scope of the following claims.

The invention described herein may be manufactured and used by or for the Government of the United States of America for governmental purposes without the payment of any royalties thereon or therefor.

We claim:

1. In a cable for use in transmitting signal voltages, such as those produced by a piezoelectric device subjected to underwater explosion pressure waves of high amplitude and short duration, a pliable low resistance central conductor wire, a flexible insulative fiber glass covering snugly surrounding the central conductor, an annealed copper tube surrounding said covering and providing a small clearance space therearound, said tube having an elastic limit sufficiently high to maintain its original contour when subjected to underwater pressure pulses generated by detonation of high explosives, and a wax filler completely occupying said space, all the elements of said cable being of materials which show substantially no piezoelectric effect upon subjection of the cable to an underwater explosion.

2. In a cable for use in the underwater transmission of signal voltages such as those produced by a piezoelectric device subjected substantially simultaneously with said cable to explosion pressure waves in said water of high amplitude and short duration, a pliable small diameter central copper wire, a flexible insulative fiber glass covering snugly surrounding the central wire, a pliable annealed copper tube surrounding said covering and providing a small clearance space therebetween, said tube having an internal diameter of the order of one-sixteenth inch and a wall thickness of the order of one-thirty-second inch whereby its elastic limit is sufficiently high to maintain its original contour when subjected to underwater pressure pulses generated by detonation of high explosives, and an insulative wax filler substantially completely occupying said space, all the elements of said cable being of the materials and construction specified whereby the cable shows substantially no piezoelectric effect upon subjection to an underwater explosion and is adapted to transmit without substantial distortion a voltage signal such as produced by the piezoelectric device.

MAURICE M. SHAPIRO.
BERTRAM STILLER.

REFERENCES CITED

The following references are of record in the file of this patent:

UNITED STATES PATENTS

| Number | Name | Date |
|---|---|---|
| 220,944 | Shaw et al. | Oct. 28, 1879 |
| 225,811 | Eaton | Mar. 23, 1880 |
| 297,181 | Shelbourne | Apr. 22, 1884 |
| 313,380 | Shelbourne | Mar. 3, 1885 |
| 324,413 | Patterson | Aug. 18, 1885 |
| 378,175 | Patterson | Feb. 21, 1888 |
| 429,305 | Cobb | June 3, 1890 |
| 1,009,731 | Fisher | Nov. 28, 1911 |
| 1,107,233 | Moore | Aug. 11, 1914 |
| 2,229,967 | Flynn | Jan. 28, 1941 |
| 2,354,809 | Goldstine | Aug. 1, 1944 |